United States Patent [19]

Borgersen

[11] 4,007,834
[45] Feb. 15, 1977

[54] FASTENER PACKAGE

[75] Inventor: Egil Borgersen, Stockholm, Sweden

[73] Assignee: Nordisk Kartro Aktiebolag, Sweden

[22] Filed: Apr. 2, 1974

[21] Appl. No.: 457,220

[30] Foreign Application Priority Data

Apr. 5, 1973 Sweden .............................. 7304805

[52] U.S. Cl. .............................. 206/338; 206/347
[51] Int. Cl.² ........................................ B65D 85/24
[58] Field of Search ............... 206/3, 72, 338, 340, 206/379, 490, 343, 345–347; 224/5 MC, 15, 17–18; 227/8, 10, 107, 147, 149; 248/131

[56] References Cited
UNITED STATES PATENTS

| | | | |
|---|---|---|---|
| 1,556,240 | 10/1925 | Morrissey | 206/338 |
| 2,599,011 | 6/1952 | Phipard, Jr. | 206/490 X |
| 3,097,360 | 7/1963 | Carlson, Jr. et al. | 206/347 X |
| 3,343,741 | 9/1967 | Massacrier | 227/8 |
| 3,353,736 | 11/1967 | Bauer | 206/338 X |
| 3,451,133 | 6/1969 | Hathaway et al. | 206/379 X |
| 3,632,032 | 1/1972 | Termet | 227/10 |

FOREIGN PATENTS OR APPLICATIONS 492,524  8/1970  Switzerland .................... 206/338

Primary Examiner—Steven E. Lipman
Attorney, Agent, or Firm—Hill, Gross, Simpson, Van Santen, Steadman, Chiara & Simpson

[57] ABSTRACT

A fastener package, for use in a fastener applicator apparatus and comprising a disc shaped carrier and a plurality of fasteners, each having an elongated shank and a head. The shanks of the fasteners pass through the carrier and the under surface of their heads rest on the carrier. The disc shaped carrier is circular and carries the fasteners evenly spaced on a circular line along the peripheral portion of the circular carrier. Also disclosed is an inherently stiff support and guide body which is useful as a magazine in the fastener applicator apparatus and which has teeth or grooves for a step-wise turning thereof in order to advance the fasteners, one at a time, to an application position in the fastener applicator apparatus.

4 Claims, 8 Drawing Figures 4,007,834

FASTENER PACKAGE

FIELD OF THE INVENTION

This invention relates to fastener packages of the kind comprising a carrier member and a plurality of spaced fasteners carried thereby.

BACKGROUND OF THE INVENTION

During recent years a plurality of different types of fastener packages have been proposed. In most cases the fastener packages comprise nail strips wherein the nails are oriented in a row, parallel to each other, and are carried by a strip shaped carrier or between two carrier strips, disposed along the nail shanks. It has also been proposed to arrange screws on strips in a similar manner.

The strip shaped fastener packages of the above mentioned kind, as known hitherto, function very satisfactorily in many respects and are rather extensively used. However, despite the simplicity of such fastener packages, they suffer from the drawback, among others, that they are unneccessary expensive, due to the fact that comparatively elaborate equipment has to be used in the manufacture of the fastener packages in question.

OBJECTS OF THE INVENTION

One important object of the present invention is to obviate the just mentioned drawback by providing a fastener package which is easy to manufacture and, thus, comparatively inexpensive.

Another important object of the invention is to achieve certain advantages in the practical utilization of the fastener packages.

BRIEF DESCRIPTION OF THE INVENTION

According to the invention there is provided a fastener package, adapted to be used in a fastener applicator apparatus and comprising a disc shaped carrier and a plurality of fasteners, each having an elongated shank and a head, the shanks of said fasteners passing through the carrier and the heads of the fasteners resting on said carrier on their under surfaces, wherein said disc shaped carrier is circular and carries the fasteners evenly spaced on a circular line along the peripheral portion of the circular carrier.

IN THE DRAWINGS

DESCRIPTION OF PREFERRED EMBODIMENTS OF THE INVENTION

Figure 1:
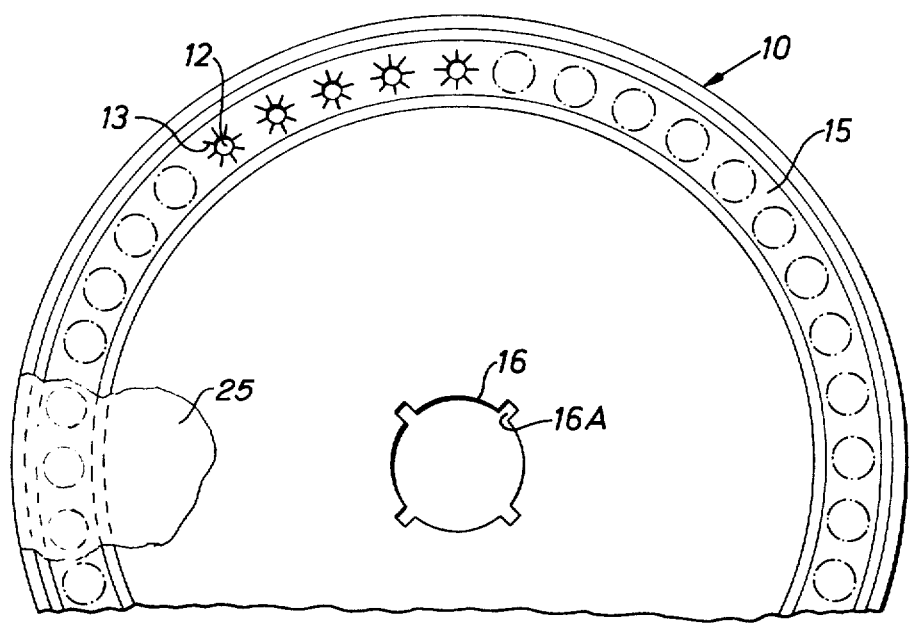
FIG. 1 is a plan view of a portion of a disc shaped carrier according to the invention.

The invention is applicable to a plurality of different types of fasteners having a shaft and a head, irrespective of whether the fasteners are nails or screws, but, inasmuch as the invention is supposed to be applied predominantly in connection with screw shaped fasteners, it will be disclosed in more details hereinafter with special reference to such fasteners.

The fastener package according to the present invention comprises a disc shaped carrier 10 for screws 11. The shanks of the screws are passed perpendicularly through the carrier and the screws may rest against the carrier on the under side of the screw heads. The carrier 10 may have pre-punched holes 12, if desired completed by slots 13, to accommodate the screws. The disc shaped carrier 10, which may be provided, on the upper side thereof, with a covering foil 25 over the screw heads, is adapted in use to be placed on an inherently stiff support and guide body, FIGS. 3 and 4, and to cooperate with this support and guide body to advance the screws into a predetermined screw driving position in a screw tightening apparatus.

Figure 2:
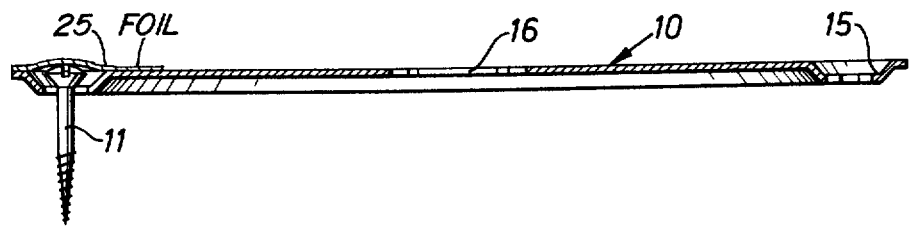
FIG. 2 is an axial cross-sectional view of the carrier in FIG. 1.

In the embodiment of the disc shaped carrier as shown in FIGS. 1 and 2 the carrier comprises an essentially circular disc of cardboard, for instance, which along the periphery thereof carriers the screws 11 evenly spaced circumferentially. As shown in FIG. 2 the disc 10 preferably has along the periphery thereof a downwardly protruding ridge 15 which on one hand serves the purpose of stiffening the disc shaped carrier 10 and on the other hand serves to guide the carrier as it has been placed on the support and guide body 14, FIGS. 3 and 4. Centrally thereof, the disc shaped carrier 10 is provided with an opening 16 which may have recesses 16A to fit on splines on a shaft of the screw tightening apparatus.

Figure 3:
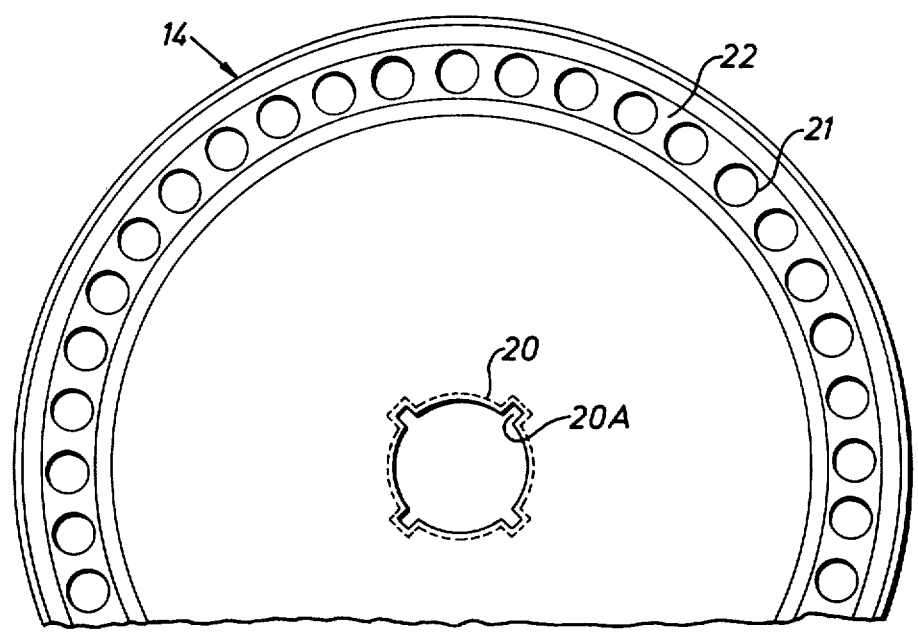
FIG. 3 is a plan view of a portion of a support and guide body according to the invention.
Figure 4:
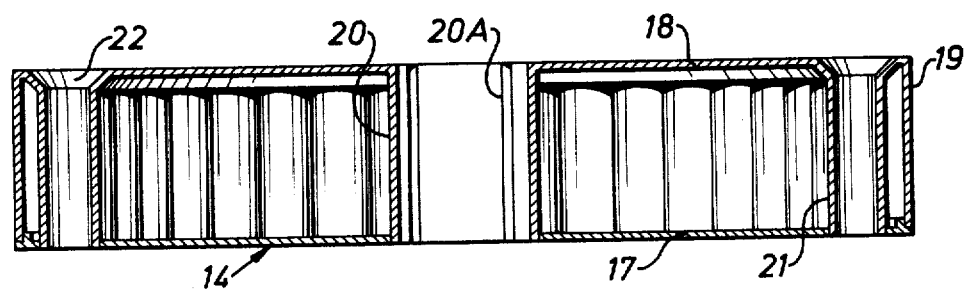
FIG. 4 is an axial cross-sectional view of the support and guide body of FIG. 3.
Figure 5:
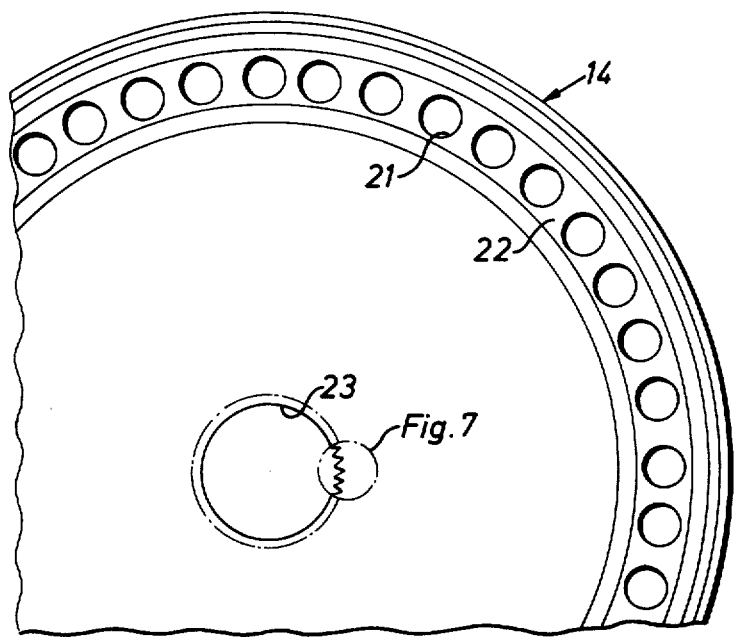
FIG. 5 is a plan view of a portion of a second embodiment of a support and guide body according to the invention.
Figure 6:
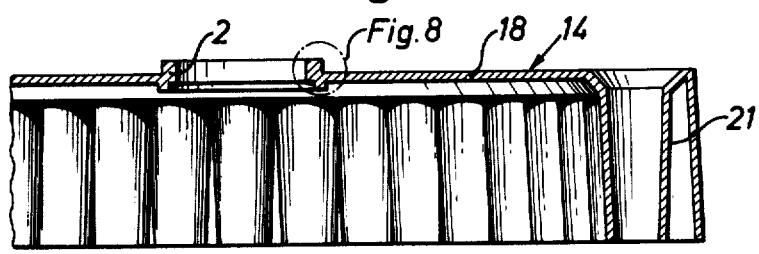
FIG. 6 is an axial cross-sectional view of the support and guide body portion in FIG. 5.
Figure 7:
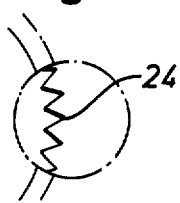
FIG. 7 shows, in an enlarged scale, the portion of the support and guide body encircled within the circle C in FIG. 5.
Figure 8:
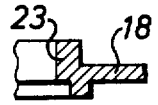
FIG. 8 shows, in an enlarged scale, the portion of the support and guide body encircled within the circle A in FIG. 6.

In the embodiment as shown in FIGS. 3 and 4 the inherently stiff support and guide body 14 comprises a circular-cylindrical drum having a bottom wall 17, a top wall 18 and surrounding sidewall 19 as well as a central, essentially cylindrical hub 20, the hub being designed to fit on a splined shaft in an apparatus for tightening the screws. Between the bottom wall 17 and the top wall 18 of the support and guide body 14 there extend a plurality of essentially cylindrical bushings 21, which, in the embodiment shown, are formed integrally with the top wall 18 and extend the full length between the bottom wall 17 and the top wall 18, parallel to the central axis of the hub 20. The cylindrical bushings 21 which are open both upwardly and downwardly, are evenly spaced circumferentially of the body and are disposed comparatively close to the outer periphery of the support and guide body 14. In the example shown forty such bushings 21 are provided along the periphery.

As shown in FIG. 4 the top wall 18 of the body 14 has close to its outer periphery a circumferential groove 22 to accomodate the ridge 15 of the carrier 10 and which thus contributes to give the carrier 10 the necessary guidance. Due to the fact that the screws 11, on mounting thereof on the disc shaped carrier 10, will be mounted very exactly, and the disc shaped carrier 10 in turn, achieves a very exact guidance on the support and guide body 14, the screws 11 will, of course, be extremely exactly centered in their respective bushings 21.

In the embodiment of the support and quide body 14 as shown in FIGS. 3 and 4 the advancement of the screws 11 into the driving position in the tightening apparatus takes place by a step-wise turning of the shaft which is passed through the hub 20 and engages therewith, such as in spline grooves 20A in the hub. In the embodiment of the inherently stiff support and guide body 14 as shown in FIGS. 4–8 the hub 23 is adapted to be positioned freely rotatable on a carrying stub shaft. In this case the rotary advancement of the support and guide body is brought about through toothed engagement with teeth 24 on the hub, FIG. 7, where the number of teeth and the pitch therebetween correspond to the number and pitch between the screw accommodating bushings 21 of the support and guide body in question.

The fastener package as described above offers a plurality of advantages, among which are to be noted:

1. The screws 11 may be mounted on the very inexpensive carrier 10 while using the screw manufacturer's existing equipment;

2. No glue or similar binder whatsoever will be needed to retain the screws 11 on the disc shaped carrier 10;

3. The disc shaped carrier 10 with the screws 11 may be easily packed and shipped in this condition to the final user, and may be placed upon the support and guide body 14 only at the final work site for loading of the screw tightening apparatus;

4. If desired, the disc shaped carrier 10 with the screws 11 may already in connection with the manufacture be placed on the inherently stiff support and guide body, which is comparatively inexpensive, in which case an extremely good protection against displacements of the screws 11 or damage thereto is ensured;

5. The loading of the screw tightening apparatus with a fresh "screw-magazine" may take place very quickly, and the screws will be very accurately guided in the apparatus, so that they in each case will be very exactly centered in the apparatus.

I claim as my invention:

1. A fastener package for use in a fastener applicator, said package comprising:
   a. a disc-shaped carrier of cardboard having a single series of evenly spaced holes arranged on a circular line of uniform radius along the peripheral portion of said carrier, said carrier being adapted at its center for driving interfit with the fastener applicator;
   b. a plurality of fasteners, each having an elongated shank and a head, the shanks respectively being disposed in said holes and extending completely through said carrier, and the heads resting on said carrier on their undersurfaces to support the fasteners; and
   c. a foil cover on the upper surface of said disc-shaped carrier, said cover covering at least the heads of the fasteners in order to secure the fasteners to the carrier.

2. A fastener package for use in a fastener applicator, said package comprising:
   a. a disc-shaped carrier of cardboard having a single series of evenly spaced holes arranged on a circular line of uniform radius along the peripheral portion of said carrier, said carrier being adapted at its center for driving interfit with the fastener applicator;
   b. a plurality of fasteners, each having an elongated shank and a head, the shanks respectively being disposed in said holes and extending completely through said carrier, and the heads resting on said carrier on their undersurfaces to support the fasteners; and
   c. said cardboard carrier at said circular line having a channel-like annular ridge protruding away from the fastener heads for stiffening said carrier, said ridge being also adapted to guide the carrier on the fastener applicator.

3. A fastener package for use in a fastener applicator, said package comprising:
   a. a disc-shaped carrier of cardboard having a single series of evenly spaced holes arranged on a circular line of uniform radius along the peripheral portion of said carrier, said carrier being adapted at its center for driving interfit with the fastener applicator;
   b. a plurality of fasteners, each having an elongated shank and a head, the shanks respectively being disposed in said holes and extending completely through said carrier, and the heads resting on said carrier on their undersurfaces to support the fasteners; and
   c. an inherently stiff body nestingly engaging and supporting said cardboard carrier, and having tubular passages in which the projecting portions of said shanks are disposed, said passages being adapted to guide the fasteners when they are driven therethrough, said body being adapted at its center for driving interfit with the fastener applicator.

4. A fastener according to claim 3, in which said body has means by which it may be indexed in a step-by-step manner about its axis, whereby the fasteners are successively moved to an application position.

* * * * *